Figure 1:
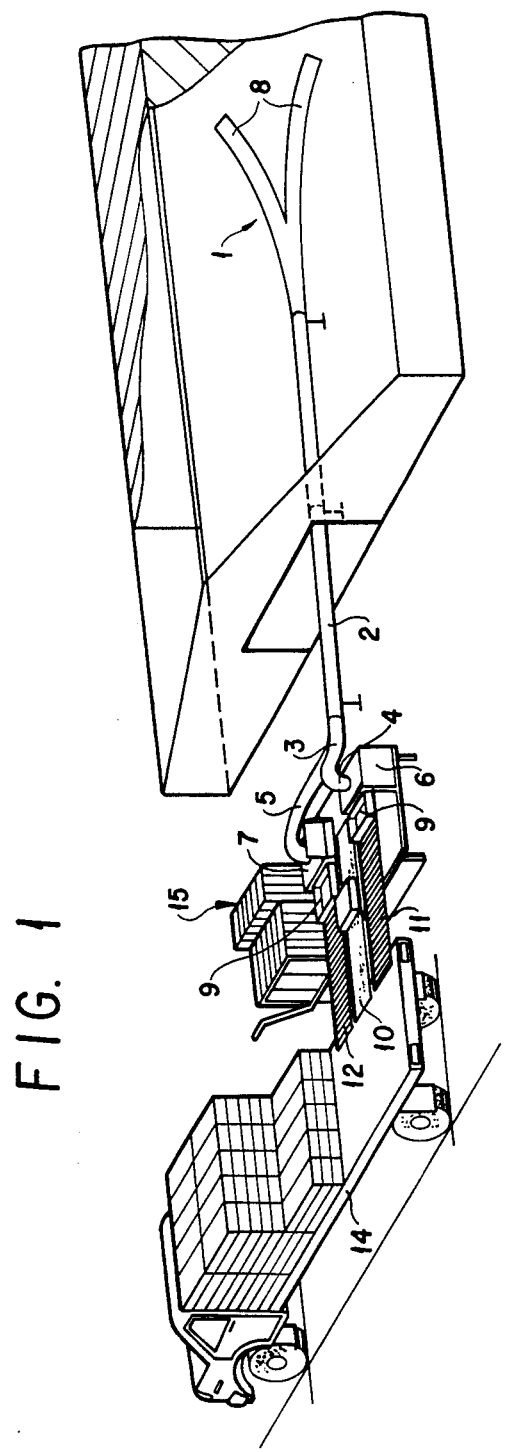

United States Patent [19]

Boertien

[11] Patent Number: 4,765,278
[45] Date of Patent: Aug. 23, 1988

[54] CATCHING APPARATUS FOR POULTRY, IN PARTICULAR FOR CHICKS

[75] Inventor: Johannes Boertien, Elim, Netherlands

[73] Assignee: Technisch Bureau Boertien, Elim, Netherlands

[21] Appl. No.: 907,729
[22] PCT Filed: Dec. 24, 1984
[86] PCT No.: PCT/NL84/00046
 § 371 Date: Oct. 14, 1986
 § 102(e) Date: Oct. 14, 1986
[87] PCT Pub. No.: WO86/03652
 PCT Pub. Date: Jul. 3, 1986

[30] Foreign Application Priority Data

Jun. 20, 1983 [NL] Netherlands .................. 8302189

[51] Int. Cl.$^4$ .............................................. A01K 29/00
[52] U.S. Cl. .................................................. 119/82
[58] Field of Search ............................ 119/82, 97 R

[56] References Cited

U.S. PATENT DOCUMENTS

Re. 28,708  2/1976  Reynolds .................. 119/82
3,103,915   9/1963  Crain et al. ............... 119/82
3,110,388  11/1963  Elliott et al. ........... 119/82 X
4,232,632  11/1980  Kice ........................ 119/82
4,301,769  11/1981  Mola ....................... 119/82

FOREIGN PATENT DOCUMENTS 1388613  3/1975  United Kingdom .

Primary Examiner—Robert P. Swiatek
Attorney, Agent, or Firm—Bernard, Rothwell & Brown

[57] ABSTRACT

A catching apparatus for poultry, in particular for chicks, has a circuit for pneumatic transport of the poultry with a tube (2) of a diameter suitable for pneumatic transport of poultry through the tube. The tube has a catching end (8) and a delivery end with branches (4, 5) connected to respective suction boxes (6, 7). The suction boxes (6, 7) have respective pairs of walls (30, 31, 32, 33) to be opened for receiving and discharging poultry transport boxes. The suction boxes are connected to a blower (17) so as to produce air suction flow through the tube from the catching end to the delivery end into the suction boxes. The suction boxes contain loading places for loading poultry transport boxes with the pneumatic transported poultry. Bypasses (26, 26') reduce air flow speed in the delivery end.

4 Claims, 2 Drawing Sheets

CATCHING APPARATUS FOR POULTRY, IN PARTICULAR FOR CHICKS

The invention relates to a catching apparatus for poultry, in particular for chicks, comprising a circuit for pneumatic transport of the poultry, provided with a tube of a diameter suitable for pneumatic transport of the poultry through the tube, said tube having a catching end, and a delivery end, respectively, for the poultry, and with means connected to the tube for producing an air suction flow in the tube in the direction of the catching end towards the delivery end.

Such an apparatus is known from British Patent No. 1,388,613. This prior art apparatus has the object to transport the poultry caught therewith in a compartmentalized container arranged on the loading floor of a truck to the eventual destination, mostly the slaughter-house. The supply of the poultry to the compartments in the container takes place pneumatically by means of a transport tube. A system is used wherein the poultry to be transported is caught by sucking the animals into the tube wherein an air suction flow is maintained and by pneumatically transporting these animals directly to the container under the influence of the air flow, delivering them to the respective compartments, to which the tube is detachably coupled. The speed at which the poultry exits from the tube is essentially equal to the transport speed through the tube.

It is an object of the invention to provide an apparatus of the above described type, wherein, however, the animals are loaded not in a container, but in transport boxes having accommodation for a limited number of animals which are transported in that form to the destination, such as the slaughter-house, said boxes being stacked onto each other and arranged on the loading floor of e.g. a truck. In particular, it is an object of the invention to provide an apparatus enabling to supply the animals at a controllable speed, in particular a reduced speed relative to the transport speed through the tube, to the transport boxes.

The invention is characterized in that the circuit comprises a suction box having one or more walls to be opened, which suction box is connected to the means for producing the air suction flow and within which the delivery end of the tube is provided, while the suction box contains a loading place for loading a poultry transport box with the pneumatically transported poultry.

According to a further embodiment of the invention, the apparatus comprises control means for the air flow speed in the form of one or more bypasses, the one end of which is connected to a tube portion situated ahead of the suction chamber and the other end terminates in the suction chamber beyond the loading place.

Preferably, the walls of the suction box to be opened are connectable to transport means for the separate supply, and discharge, respectively, of the poultry transport boxes to and from, respectively, the suction box.

In connection with the embodiment indicated in the preceding paragraph, it is furthermore highly advantageous to design the apparatus in such a manner that the tube divides into two branches, the delivery ends thereof terminating each individually in either of the two suction boxes, while adjacent the branching point the tube is fitted with collapsible direction flaps for guiding the pneumatically supplied poultry to each of the suction boxes. Thus, in spite of a charge-wise fill-up of the animals, nevertheless a continuous capture of the animals has become possible.

Figure 2:
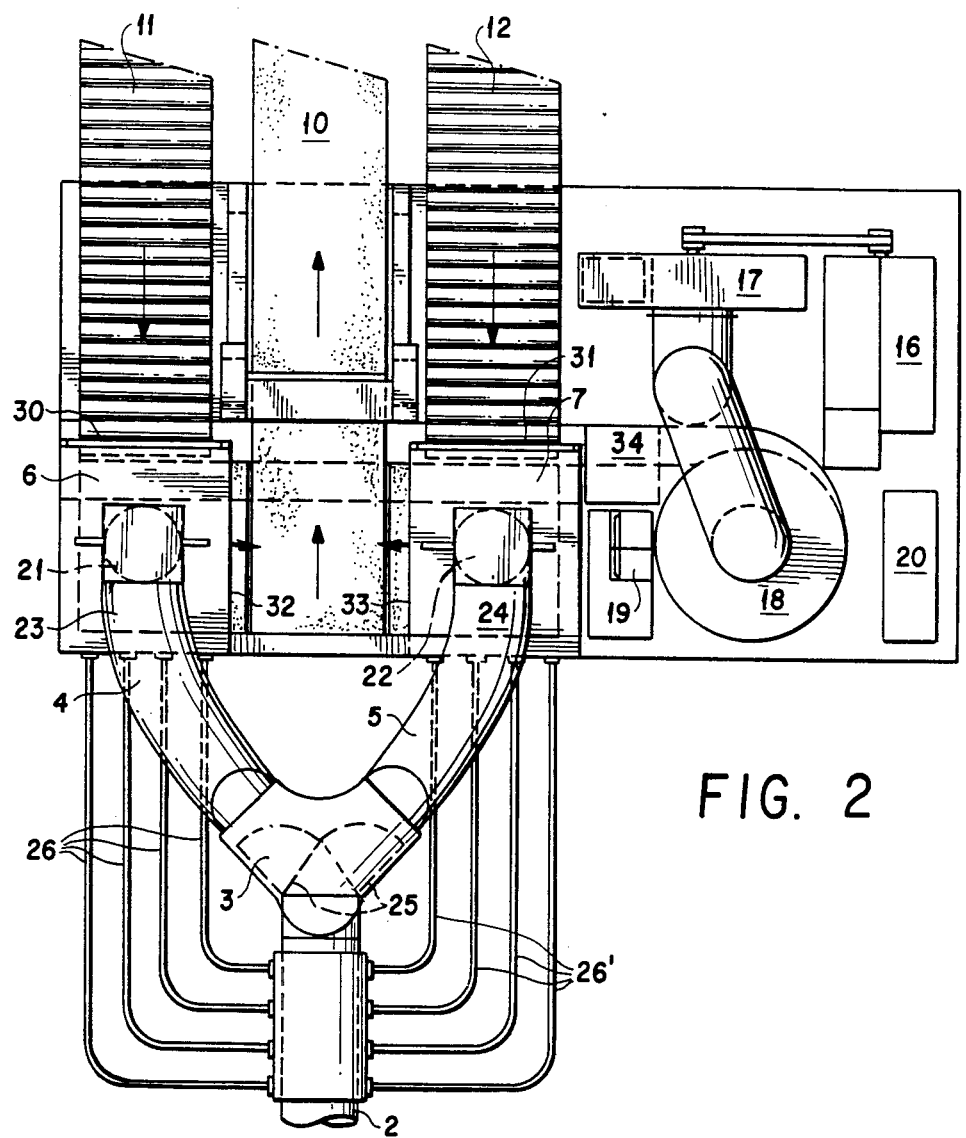

One embodiment of the apparatus according to the invention will now be described by way of example with reference to the accompanying drawings, in which:

FIG. 1 is a diagrammatic view of the arrangement of the apparatus according to the invention within the entire system of the capture of the animals to be transported, the loading thereof in transport boxes and the supply to and stacking on the loading floor of a truck of the filled-up transport boxes;

FIG. 2 more in particular is a top view of an embodiment of the apparatus according to the invention.

In the drawing, 1 represents the catching apparatus with the transport tube 2, which branches at 3, which branches 4, 5 are connected to the suction boxes 6, 7.

At the catching end, 8 represents a flexible forked hose connected to the transport tube 2.

At 9 are indicated empty transport boxes for being conveyed on roller tracks 11, 12 through respective openable sides 30 and 31 into the respective suction boxes 6 and 7. The filled-up transport boxes are transferred alternately from the suction boxes 6, 7 through respective openable sides 32, 33 onto conveyor belt 10 and supplied to the truck 14 where the transport boxes are manually taken off and stacked.

The apparatus required for operating the catching apparatus is shown at 15 in FIG. 1 and comprises (FIG. 2) a Diesel engine 16 driving a blower 17 for producing suction or partial vacuum through filter 18 and duct 34 to suction boxes 6 and 7. A compressor 19 and a meter box with switch desk 20 are provided for controlling the apparatus.

The end portions 23, 24 of the transport tube 2, at the delivery end thereof, contain shut-off valves 21, 22 by means of which the supply of the suction box can be opened or closed when an empty transport box is arranged in the respective suction box for being loaded, or has to be removed from the suction box when it is filled. At 25 are indicated direction flaps by means of which the air flow in the transport tube 2 can be conducted to the suction boxes 6, 7. Valve 22 is therefore opened.

Finally, 26, 26' indicate a set of conduits which is connected on the one end to the transport tube 2, upstream adjacent the branching point 3 and the other end of which terminates in a suction box in a place after the transport box disposed therein. Through said conduits 26, 26' air is withdrawn from the main flow of the air in the tube 2 so that the air flow speed decreases and the animals entrained by the air flow arrive in the transport box at a lower adapted speed. Thus, an average air flow speed maintained in practice for the pneumatic transport of chicks of 30-50 m/sec. can be reduced to a desired speed level of 20-30 m/sec. on supply to the transport box. Naturally, the catching apparatus according to the invention, as discussed in the above and shown in the drawings, can be modified without departing from the scope of the invention.

I claim:

1. A catching apparatus for poultry, in particular for chicks, comprising a circuit for pneumatic transport of the poultry, provided with a tube of a diameter suitable for pneumatic transport of the poultry through the tube, said tube containing a catching end, and a delivery end, respectively, for the poultry, and with means connected to the tube for producing an air suction flow in the tube in the direction of the catching end towards the delivery end, characterized in that the circuit comprises
- a suction box having one or more walls to be opened, which suction box connects to the means for producing the air suction flow and within which the delivery end of the tube is disposed, while the suction box contains a loading place for loading a poultry transport box with the pneumatically transported poultry; and
- control means for the air flow speed, including one or more bypasses, one end of which is connected to a portion of the tube situated ahead of the suction box, and the other end of which terminates in the suction box beyond the loading place.

2. An apparatus according to claim 1, characterized in that the walls of the suction box to be opened are connectable to transport means for the separate supply and discharge, respectively, of the poultry transport box to, and from, respectively, the suction box.

3. An apparatus according to claim 1, characterized in that the tube is closable at the delivery end by a valve disposed therein.

4. An apparatus according to claim 1, 2 or 3, characterized in that the tube divides into two branches, the delivery end thereof terminating each individually in either of two suction boxes, while adjacent the branching point the tube is provided with collapsible direction flaps for guiding the pneumatically supplied poultry to each of the suction boxes.

* * * * *